United States Patent [19]

Koenig et al.

[11] 4,268,641

[45] May 19, 1981

[54] ACRYLIC ACID-ACRYLATE COPOLYMER THICKENING AGENTS

[75] Inventors: Harvey S. Koenig, Charlotte, N.C.; George M. Bryant, Charleston, W. Va.

[73] Assignee: Union Carbide Corporation, New York, N.Y.

[21] Appl. No.: 154,521

[22] Filed: May 29, 1980

Related U.S. Application Data

[63] Continuation-in-part of Ser. No. 32,771, Apr. 24, 1979, abandoned.

[51] Int. Cl.$^3$ .................. C08F 20/06; C08F 20/26; C08F 20/36
[52] U.S. Cl. .................. 525/367; 260/29.6 RW; 260/29.6 PM; 260/29.6 CM; 260/29.6 AT; 525/369; 525/374; 525/378; 525/379; 526/317; 526/328; 526/310; 526/311
[58] Field of Search ............... 526/317, 328, 310, 311, 526/910; 260/29.6 RW, 29.6 PM, 29.6 CM, 29.6 AT; 525/367, 369, 374, 378, 379

[56] References Cited

U.S. PATENT DOCUMENTS

| | | | |
|---|---|---|---|
| 2,892,793 | 6/1959 | Stewart et al. | 252/56 |
| 3,035,004 | 5/1962 | Glavis | 260/29.7 W |
| 3,052,648 | 9/1962 | Bauer | 525/259 |
| 3,106,482 | 10/1963 | Van Dijk | 427/342 |
| 3,317,483 | 5/1967 | Verdol | 528/480 |
| 3,436,378 | 4/1969 | Azorlosa et al. | 526/271 |
| 3,492,254 | 1/1970 | Strand et al. | 260/17 R |
| 3,499,876 | 3/1970 | Field et al. | 526/271 |
| 3,652,497 | 3/1972 | Junas et al. | 525/328 |
| 3,657,175 | 4/1972 | Zimmerman et al. | 260/29.6 T |
| 3,660,339 | 5/1972 | Schuh | 260/29.7 D |
| 3,708,445 | 1/1973 | Junas et al. | 260/4 R |
| 3,794,608 | 2/1974 | Evani et al. | 260/29.6 RW |
| 3,894,980 | 7/1975 | DeTommaso | 260/29.6 RW |
| 3,896,070 | 7/1975 | Tummler et al. | 260/29.4 UA |
| 3,896,072 | 7/1975 | Tummler et al. | 260/29.6 TA |
| 4,085,167 | 4/1978 | Lewis et al. | 525/301 |
| 4,138,381 | 2/1979 | Chang et al. | 260/29.6 TA |

*Primary Examiner*—John Kight, III
*Attorney, Agent, or Firm*—Bernard Francis Crowe

[57] ABSTRACT

Copolymers of acrylic acid and nonionic surfactant acrylates have been found to be useful thickening agents for both aqueous solutions and water/liquid hydrocarbon emulsions.

7 Claims, No Drawings

ACRYLIC ACID-ACRYLATE COPOLYMER THICKENING AGENTS

This is a continuation-in-part of Ser. No. 032,771 filed Apr. 24, 1979, now abandoned.

BACKGROUND OF THE INVENTION

This invention pertains to the preparation of copolymers of acrylic acid and nonionic surfactant acrylates and more particularly to their use as thickening agents for aqueous solutions and water/liquid hydrocarbon emulsions.

Various synthetic thickening agents composed of carboxylic acid monomers, such as acrylic acid, and a polyfunctional crosslinking monomer are known in the art. These interpolymers produce viscous, aqueous mucilages. However, these interpolymers rely upon the crosslinking monomer to achieve the desired aqueous thickening properties. U.S. Pat. Nos. 2,798,053, 2,858,281, and 3,426,004 disclose respectively polyallyl sucrose, polybutadiene and triallyl phosphate or phosphite esters as crosslinking monomers for polyacrylic acid to achieve interpolymers capable of producing viscous aqueous mucilages upon neutralization. U.S. Pat. No. 2,798,053 describes crosslinked copolymers of acrylic or methacrylic acid with minor amounts of vinyl, allyl and methallyl ethers of polyhydric alcohols having at least 4 carbon atoms and at least 3 alcoholic hydroxy groups, wherein the preferred polyalkenyl polyether monomers are polyallyl sucrose and polyallyl pentaerythritol containing an average of at least about 3 allyl groups per polyhydric alcohol. Similarly U.S. Pat. No. 3,426,004 describes crosslinked interpolymers of acrylic or methacrylic acids with from 0.1 to 2 weight percent of a polyallyl phosphate or a polyallyl phosphite ester such that at least 2 allyl ester functionalities and preferably 3 allyl ester functionalities are incorporated into the phosphate or phosphite monomer. U.S. Pat. No. 2,858,281 discloses the use of a polymeric crosslinking agent, polybutadiene, in forming the acrylic acid interpolymers.

U.S. Pat. No. 3,530,102 issued to Union Carbide Corporation describes terpolymers of maleic anhydride, vinyl alkyl ether and divinylbenzene as thickening agents.

U.S. Ser. No. 494,447 discloses ethylene-maleic anhydride interpolymers crosslinked with triallyl isocyanate to form a thickening agent.

U.S. Pat. Nos. 3,915,921 and 3,940,351 disclose synthetic thickening agents composed of acrylic acid and non-crosslinking comonomers. Alkyl acrylate esters having 10 to 30 carbon atoms in the alkyl portion are described as the non-crosslinking comonomers. Optionally a crosslinking agent is also disclosed, polyalkenyl polyethers.

The use of nonionic surfactant monomers and the preparation of synthetic thickening agents has been disclosed in U.S. Pat. Nos. 3,779,970 and 3,794,608.

Belgium Pat. No. 846,348 describes synthetic thickening agents composed of carboxamides and esters of maleic or fumaric acids which are useful as pigment printing thickeners. The maleic or fumaric acid is esterified with nonionic surfactants, such as, polyalkylene oxide adducts of alkyl alcohols, arylalkyl alcohols, and the like.

Polymers composed of a carboxylic acid monomer and one or more comonomers of which one monomer may be a multifunctional crosslinking monomer and in which the majority of the polymer is derived from the hydrophilic carboxylic acid monomer are typical of the synthetic thickening agents known in the art. Neutralization of the carboxylic acid-containing polymers in water produces gel-like polymers or mucilages exhibiting high viscosities. These polyelectrolyte polymers are useful as bodying and suspending agents in various applications such as pharmaceuticals, dentifrices, ointments, coatings, printing pastes, and the like. The rheological and solution properties of the neutralized polymers impart desirable characteristics to the various mucilage formulations. For example, the carboxylic acid-containing interpolymers described in several of the references delineated above produce highly viscous aqueous solutions which are thixotropic in nature and are readily formulated into useful creams, ointments, pastes, and the like. However, these high molecular weight interpolymers suffer the disadvantage of being sensitive to inorganic electrolytes, such as, sodium chloride. The ion-sensitive thickeners do not effectively maintain their viscosity and drastic viscosity losses in the presence of inorganic electrolytes are observed. Such ion-sensitivity is deleterious to the performance of these thickeners when they are included in formulations such as latexes, food preparations, cosmetic creams, ionic detergents, and dye pastes. One attempt to overcome this deficiency was disclosed in U.S. Pat. Nos. 3,915,921 and 3,940,351 wherein polymers composed of acrylic acid and long-chain alkyl acrylates were described as being less electrolyte sensitive than other carboxylic acid interpolymers of the prior art. However these synthetic thickeners are less efficient thickeners than the interpolymers and require the addition of a crosslinking monomer to attain high solution viscosities. Incorporation of the crosslinking agent reduces the electrolyte compatability far below the compatabilities of polymers without the crosslinker.

Polymers composed of carboxylic acid monomers and crosslinking monomers are used as thickeners for water-hydrocarbon emulsions. Water-hydrocarbon emulsions used in the preparation of printing inks, pigment printing pastes, and the like include synthetic thickeners which serve to increase the paste viscosity and to impart thixotropic properties to the formulation. Prior art polymers function adequately but the water-hydrocarbon emulsion viscosities are less than the viscosities obtained in water solutions. This requires the addition of more thickener to the paste to obtain the viscosities exhibited in an all aqueous system. Thickeners which maintain or exhibit an increase in the water-liquid hydrocarbon emulsion viscosity compared to the aqueous viscosity would permit the formulator greater latitude in the preparation of printing inks and pastes. In addition, the use of less thickener imparts a more thixotropic rheology to the formulation, a property required for the proper application of the printing ink or paste to the medium being printed.

It is therefore an object of this invention to provide thickening agents with improved salt tolerance.

It is another object of this invention to provide thickening agents which have a high thickening efficiency in aqueous solutions.

It is still a further object of this invention to provide thickening agents which have a high thickening efficiency in water-liquid hydrocarbon emulsions.

SUMMARY OF THE INVENTION

The above objects are provided by a normally solid, base-neutralized copolymer having copolymerized therein about 90 to about 99 mole percent of a carboxyl-containing ethylenically unsaturated hydrocarbon and about 1 to about 10 mole percent of a nonionic surfactant acrylate having the formula:

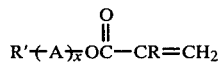

$$R'\text{-}(A)_{\overline{x}}OC\text{-}CR=CH_2$$

where R is hydrogen or methyl, R' is a hydrophobe which can be alkyl—O—, alkyl—NH—, or alkyl—CO—, where the alkyl contains r to about 30 carbon atoms, A is a divalent radical selected from the group consisting of oxyethylene units or mixed oxyalkylene units having the general formula $\text{-}(OC_n H_{2n})\text{-}$ wherein n is an integer having values from 2 to 4 and x is an integer having values of about 5 to about 40, said surfactant acrylate having an HLB value of about 10 to about 19.

The preferred carboxyl-containing ethylenically unsaturated hydrocarbon is acrylic acid. One may also use methacrylic acid, maleic acid, fumaric acid, itaconic acid, and the like, if desired.

Although about 90 to about 99 mole percent of carboxyl-containing ethylenically unsaturated hydrocarbon can be present in the copolymer of this invention, it is preferred to incorporate about 96 to about 99 mole percent in the copolymer.

The nonionic surfactant acrylate used to make the copolymer of this invention can be prepared by known methods of acrylation with acrylic acid of an hydroxyl terminated compound consisting of a hydrophobe and hydrophile moiety. This hydroxyl terminated compound is prepared by forming an alkylene oxide adduct of a fatty acid, a primary or secondary saturated aliphatic alcohol or a saturated aliphatic amine. The hydrophobe moiety obtained thereby contains about 4 to 30 carbon atoms, preferably about 11 to 30 carbon atoms and even more preferably about 15 to 30 carbon atoms. The hydrophile moiety can contain at least 5 oxyethylene units when the alkylene oxide used is ethylene oxide and preferably at least 7 moles of oxyethylene units or in the case of an alkylene oxide mixture of ethylene oxide and propylene oxide, at least 7 mixed oxyalkylene units and preferably at least 9 mixed oxyalkylene units.

The acylation can be effected by such well known reactions as the Schotten-Baumann method, and the like. The resultant non-ionic surfactant acrylates thus obtained should have a HLB value of about 10 to 19 and preferably about 12 to 18. The HLB or hydrophilic-lipophilic balance method of surfactant classification defines amphipathic materials, i.e., those having hydrophilic and lipophilic groups in their structures corresponding to numerical values assigned according to the solubility of the surfactant in oil or water. The HLB values can also be calculated from group contributions. The HLB scheme is described in detail in "Emulsions and Emulsion Technology," Surfactant Science Series, Vol. 6, Part I, page 77, edited by K. J. Lissant, Marcel Dekker, Inc., New York City, 1974.

The preparation of non-ionic surfactants is described in Nonionic Surfactants, Vol. 1, editor M. J. Schick, Marcel Dekker, Inc., New York City, 1967. The preparation of acrylate esters of nonionic surfactants is also well known in the art and general preparations are disclosed in U.S. Pat. Nos. 3,341,627 and 3,896,161.

In the case of mixed alkylene oxide adducts the copolymers of this invention can be prepared with blocks of ethoxy units followed by propoxy units, propoxy units followed by ethoxy units or a random mixture of both.

The copolymers of this invention are preferably made by polymerizing the comonomers in an inert diluent having solubilizing character on the monomer ingredients but substantially none on the resultant copolymer. Suitable diluents include aromatic solvents such as benzene, toluene, xylene, tetralin, and the like, as well as saturated aliphatic solvents including hexane, heptane, octane, and the like, and saturated cycloaliphatic compounds, such as cyclopentane, cyclohexane, cycloheptane, and the like. Halogenated solvents can also be used, such as, carbon tetrachloride, bromotrichloromethane, trichlorofluoromethane, tetrafluoromethane, 1,1,2-trichloro-1,2,2-trifluoromethane, 1,2-difluoro-1,1,2,2-tetrachloroethane, trichloroethane, perchloroethylene, and the like.

Polymerization of the monomers in the diluent is carried out in the presence of a solvent-soluble free radical catalyst in an inert atmosphere in a closed vessel. The temperature of polymerization may be varied from room temperature to about 150° C. depending upon the diluent and free radical catalyst employed. Polymerization of comonomers in an open vessel under reflux and under an inert atmosphere is also suitable. The temperature of polymerization under these conditions depends upon the boiling point of the inert diluent used. The polymerizations proceed to yield 90 to 100 percent copolymer upon reaction at 60° to 110° for 6 hours or longer.

Suitable solvent-soluble free radical catalyst include benzoyl peroxide, hydrogen peroxide, caprylyl peroxide, cumene hydroperoxide, tertiary butyl perbenzoate, azobisisobutyronitrile, and the like.

Inasmuch as the copolymers thus prepared in the diluent enumerated above which are solvents for the comonomers and non-solvents for the copolymers the product precipitates from the reaction mixture as a fine powder. Removal of the diluent by filtration and decantation or vacuum stripping yields a fine, white, powdery copolymer.

Alternative methods of polymerization including inert emulsion polymerization in hydrocarbon solvents and emulsion polymerization in aqueous salt solution can be used but are more difficult to control and some cases require a monomer feed sequence reaction as opposed to simple monomer batch charge.

The copolymers of this invention attain their maximum use as synthetic thickeners in aqueous or water-hydrocarbon solvent emulsions upon neutralization of the copolymers prepared as above with a base. The term base as used herein includes both organic and inorganic bases exemplified by ammonium hydroxide, sodium hydroxide, alkyl amines, alkali carbonates, alkali bicarbonates, ammonium or amine salts of hydroxide, and the like. The choice of base then is not narrowly critical and a wide latitude in chosing one may be used by those skilled in the art.

Optimum aqueous thickening is obtained with copolymers composed of acrylic acid and from about 1 to about 4 mole percent of a nonionic surfactant acrylate having an HLB of about 18. The hydrophile portion of the surfactant thus described contains about 20 to about 40 moles and preferably about 30 to 40 moles of ethylene-oxide. The hydrophobe portion of the surfactant acrylate in the above example is composed of a monohydric hydrocarbon alcohol, acid or amine having at least 11 carbon atoms and preferably at least 15 carbon atoms contained therein. The chemical nature of the hydrophobe, that is, primary or secondary alcohol or amine or fatty acid, exerts less influence on the copolymer's aqueous thickening efficiency than its molecular weight, i.e., total number of carbon atoms in the copolymer.

Optimum water-hydrocarbon solvent emulsion viscosities are obtained by polymers composed of acrylic acid and from about 1 to about 4 mole percent of nonionic surfactant acrylate such that the hydrophobe of the surfactant is composed of a linear primary alcohol of at least 8 carbon atoms and preferably at least 11 carbon atoms and the hydrophile portion is composed of at least 7 moles of ethylene oxide or mixed ethylene oxide-propylene oxide, and preferably at least 9 moles of alkylene oxide.

Polymers of this invention displaying optimum salt compatability compared to synthetic thickeners of the prior art are composed of acrylic acid in about 1 to about 4 mole percent of a nonionic surfactant acrylate such that the hydrophobe portion of the surfactant acrylate is composed of a linear primary alcohol containing at least 8 carbon atoms, preferably at least 11 carbon atoms and the hydrophile portion of the surfactant is composed of at least 5 moles of ethylene oxide or mixed oxides, preferably at least 7 moles of ethylene oxide or mixed oxides.

The effects of polymer composition on the aqueous and water-hydrocarbon emulsion viscosities and the ion sensitivity of the polymers were assessed by measuring the Brookfield (Model RVT) viscosities at 20 rpm.

The invention is further described in the examples which follow. All parts and percentages are by weight unless otherwise specified.

EXAMPLE 1

PREPARATION OF NONIONIC SURFACTANT ACRYLATES

The Schotten-Baumann method was used for preparing a series of nonionic surfactant acrylates as follows:

A mole equivalent of a nonionic surfactant was dissolved in five times its weight of toluene contained in a four-necked-round bottomed flask equipped with a condenser, thermometer, dropping funnel, mechanical stirrer, nitrogen inlet tube and Glas-col heating mantle. The nonionic surfactants used in the preparation of the surfactant acrylates included linear primary alcohol ethoxylates, linear primary alcohol ethoxylates-proproxylates, and secondary alcohol ethoxylates. A mole equivalent of triethylamine was added to the stirred solution. A mole equivalent of acryloyl chloride dissolved in a equal weight of toluene was added to the solution portion wise. The reaction was allowed to proceed at reflux temperature for 4 hours. The reaction mixture was then cooled to room temperature and the amine hydrochloride which formed was removed by suction filtration. The toluene was removed from the filtrate in vacuo to yield the nonionic surfactant acrylate. Identification of specific commercially available surfactants together with the number of ethoxy and/or propoxy units as well as their HLB values and molecular weights are given in Table 1.

EXAMPLE 2

PREPARATION OF COPOLYMER THICKENING AGENTS

A series of batch polymerizations of acrylic acid and the acrylic acid ester of TERGITOL 15-S-40 was carried out in benzene at 60° C. using azobisisobutronitrile as the polymerization initiator. The polymerizations were carried out in 16-ounce capped glass bottles and in an inert atmosphere of nitrogen. The resultant polymers, insoluble in the benzene diluent, were collected by suction filtration, washed, and dried in an oven at 60° C. Aqueous solutions of the resultant polymers were prepared by neutralizing 2.0 grams of said polymers contained in 396.5 grams of distilled water with 1.5 grams of ammonium hydroxide. Water-Varsol (Trademark for a hydrocarbon solvent sold by Exxon Corporation having a boiling range of 315° to 380° F. and consisting mainly of saturated and aromatic distillation fractions) emulsions of the resultant copolymers were prepared by neutralizing 1.0 grams of the copolymer contained in 120.0 grams of distilled water, 75.0 grams of Varsol, 2.5 grams of the surfactant TERGITOL 15-S-9 with 1.5 grams of ammonium hydroxide.

Table 2 delineates the viscosity data of 0.5 weight percent solutions of six acrylic acid-TERGITOL-S-40 acrylate copolymers containing 0.90 to 3.5 mole percent TERGITOL 15-S-40 acrylate copolymerized therein. The surfactant acrylate content is indicated as mole percent of monomer charge. These data indicate that a maximum aqueous and emulsion viscosity is obtained at 2.0–3.0 mole percent surfactant acrylate. The water-Varsol emulsion viscosities are considerably greater than the corresponding aqueous viscosities.

TABLE I

| Surfactant | Nonionic Surfactants | | | |
|---|---|---|---|---|
| | EO[a] | PO[b] | HLB[c] | Mol. Wt.[d] |
| TERGITOL 15-S-40[e] | 40 | — | 18.0 | 1962 |
| TERGITOL 15-S-12[e] | 12 | — | 14.5 | 788 |
| NEODOL 25-12[f] | 12 | — | 14.5 | 734 |
| EPAL[g] 1214-7, 1 | 7 | – | 12.3 | 516 |
| EPAL[h] 1214-8, 1.5 | 8 | 1.5 | 10.9 | 634 |
| EPAL[i] 1418-6, 4.5 | 6 | 4.5 | 7.4 | 767 |
| UCON[j] 80 HB-192 | 11 | 2 | 14.3 | 685 |
| UCON[k] 50 HB-5100 | 47 | 35 | 10.0 | 4100 |

[a]Moles of ethylene oxide adducted per mole of alcohol.
[b]Moles of propylene oxide adducted per mole of alcohol.
[c]Hydrophilic-lipophilic balance.
[d]Weight average molecular weight.
[e]Trademark for an ethylene oxide adduct of a mixture of $C_{12}$ to $C_{15}$ isomeric linear alcohols sold by Union Carbide Corp.
[f]Trademark for an ethylene oxide adduct of a mixture of $C_{12}$ to $C_{15}$ isomeric linear alcohols sold by Shell.
[g]Trademark of Ethyl Corp. for a linear primary alcohol mixture having a molecular weight of 200 and 12 to 14 carbon atoms which were ethoxylated with 7 moles of ethylene oxide per mole of Epal 1214.
[h]Trademark of Ethyl Corp. for a linear primary alcohol having 12 to 14 carbon atoms which were alkoxylated with 8 moles of ethylene oxide and 1.5 moles of propylene oxide per mole of Epal 1214.
[i]Trademark of Ethyl Corp. for a linear primary alcohol having 14 to 18 atoms which were alkoxylated with 6 moles of ethylene oxide and 4.5 moles of propylene oxide per mole of Epal 1418.
[j]UCON 80 HB-192 is a Trademark of Union Carbide Corp. for butanol alkoxylated with 11 moles of ethylene oxide and 2 moles of propylene oxide.
[k]UCON 50 HB-5100 is a Trademark of Union Carbide Corp. for butanol alkoyxlated with 47 moles of ethylene oxide and 35 moles of propylene oxide.

TABLE II

Aqueous and Emulsion Viscosities of
Acrylic Acid-TERGITOL 15-S-40 Acrylate Copolymers

| Copolymer | Mole % TERGITOL 15-S-40 Acrylate | Viscosities (cps) of 0.5% Polymer In Water | Water-Varsol |
|---|---|---|---|
| 1 | 0.90 | 7,000 | 39,400 |
| 2 | 1.35 | 10,400 | 37,200 |
| 3 | 2.0 | 22,800 | 80,000 |
| 4 | 2.5 | 26,000 | 46,000 |
| 5 | 3.0 | 21,650 | 72,000 |
| 6 | 3.5 | 15,600 | 56,000 |

EXAMPLE 3

Employing the procedures of Example 2, a series of acrylic acid-TERGITOL 15-S-12 acrylate copolymers was made and evaluated with the results depicted in Table III. The aqueous and water-Varsol emulsion viscosities of the polymers increase with increasing TERGITOL 15-S-12 acrylate. The emulsion viscosities are greater than the corresponding aqueous viscosities.

TABLE III

Aqueous and Emulsion Viscosities of
Acrylic Acid-TERGITOL 15-S-12 Acrylate Copolymers

| Polymer | Mole % TERGITOL 15-S-12 Acrylate | Viscosities (cps) of 0.5% Polymer Aqueous | Water-Varsol |
|---|---|---|---|
| 1 | 1.5 | 1400 | 22400 |
| 2 | 2.0 | 2750 | 45600 |
| 3 | 2.5 | 4500 | 56000 |
| 4 | 3.0 | 7000 | 70800 |
| 5 | 3.5 | 9000 | 81000 |
| 6 | 4.0 | 10400 | 78400 |

EXAMPLE 4

Using the procedures of Example 2, a series of acrylic acid-NEODOL 25-12 acrylate copolymers was made and evaluated with the results shown in Table IV. The aqueous and emulsion viscosities increase with increasing NEODOL 25-12 acrylate mole percent monomer charge. The emulsion viscosities are considerably greater than the corresponding aqueous viscosities.

TABLE IV

Aqueous and Emulsion Viscosities of
Acrylic Acid-NEODOL 25-12 Acrylate Copolymer

| Polymer | Mole % NEODOL 25-12 Acrylate | Viscosities (cps) of 0.5% Polymer Aqueous | Water-Varsol |
|---|---|---|---|
| 1 | 1.5 | 1276 | 54400 |
| 2 | 2.0 | 2175 | 83400 |
| 3 | 2.5 | 2990 | 104600 |
| 4 | 3.0 | 4085 | 93400 |
| 5 | 3.5 | 4240 | 97000 |
| 6 | 4.0 | 5340 | 97400 |

EXAMPLE 5

Employing the procedure of Example 2, a series of acrylic acid-nonionic surfactant acrylates was made and evaluated. The surfactant acrylates were EPAL 1214-7, EPAL 1214-8, 1.5 and EPAL 1418-6, 4.5. That data depicted in Table V reveal that the EPAL 1418-6, 4.5 surfactant acrylate containing polymers produce exceptionally viscous water-Varsol emulsions. The other EPAL alkoxylate acrylate containing polymers produce emulsion viscosities similar to the NEODOL 25-12 acrylate containing thickeners. The aqueous viscosities of these polymers are less than the thickeners containing surfactant acrylates with high HLB values; that is high ethylene oxide content.

TABLE V

Aqueous and Emulsion Viscosities of
Acrylic Acid-Nonionic Surfactant Acrylate Copolymers

| Mole % Nonionic Surfactant Acrylate | Viscosities (CPS) of 0.55 Polymer Containing | | | | | |
|---|---|---|---|---|---|---|
| | EPAL 1214-7 | | EPAL 1214-8, 1.5 | | EPAL 1418-6, 4.5 | |
| | Aqueous | Water-Varsol | Aqueous | Water-Varsol | Aqueous | Water-Varsol |
| 1.5 | 230 | 16100 | 274 | 26150 | 2065 | 132600 |
| 2.0 | 764 | 44600 | 600 | 50400 | 3090 | 124400 |
| 2.5 | 946 | 61600 | 1460 | 65400 | 5800 | 125600 |
| 3.0 | — | 81200 | 2440 | 79400 | 5600 | 119600 |
| 3.5 | 2010 | 9300 | 2710 | 84600 | 6100 | 121400 |
| 4.0 | 2065 | 100400 | 2500 | 99600 | 6600 | 121600 |

EXAMPLE 6

Using the procedure of Example 2, a series of acrylic acid-UCON Fluid acrylate copolymers was made and evaluated. UCON Fluids 80 HB 192 and 50 HB 5100 acrylates were used to prepare the copolymers. The data shown in Table IV reveal that the random ethoxylate-propoxylate adducts of butanol are less efficient viscosity improvers of water-Varsol emulsions compared to the higher molecular weight linear primary alcohol hydrophobes but the aqueous viscosity efficiencies are similar.

TABLE VI

Aqueous and Emulsion Viscosities of
Acrylic Acid-UCON Fluid Acrylic Copolymers

| Mole % UCON FLUID Acrylate | Viscosities (CPS) of 0.5% Polymer Containing | | | |
|---|---|---|---|---|
| | UCON 80 HB 192 | | UCON 50 HB 5100 | |
| | Aqueous | Water-Varsol | Aqueous | Water-Varsol |
| 1.0 | — | 668 | 3720 | — |
| 2.0 | 1200 | 2720 | 8760 | — |
| 3.0 | 3870 | 7650 | 1720 | — |
| 4.0 | 6320 | 12150 | — | — |

EXAMPLE 7

Using the polymers described in Examples 2–6, the ion sensitivities were assessed by measuring the viscosities of aqueous solutions to which increments of sodium chloride were added. The data in Table VII present the percent retained viscosities of 0.5 weight percent polymer solutions containing various weight percent sodium chloride. The polymers containing linear primary alcohol alkoxylate acrylates exhibit viscosities equal to or greater than the host solution.

TABLE VII

Salt Sensitivities of Acrylic Acid Copolymers Containing 2.0 Mole Percent Nonionic Surfactant Acrylate

| Nonionic Surfactant Acrylate | Percent Retained Viscosities (CPS) of 0.5% Polymer Solutions Containing NaCl Conc. of: | | | |
|---|---|---|---|---|
| | 0.25 | 0.50 | 1.0 | 2.0 |
| TERGITOL 15-S-40 | 5 | 1 | — | — |
| TERGITOL 15-S-12 | 78 | 53 | — | — |
| NEODOL 25-12 | 124 | 87 | 30 | — |
| EPAL 1214-7 | 163 | 326 | 280 | 83 |
| EPAL 1214-8, 1.5 | 170 | 298 | 225 | 55 |
| EPAL 1418-6, 4.5 | 177 | 157 | 70 | 50 |
| UCON 80 HB 192 | 44 | 31 | — | — |

EXAMPLE VII

The following example is presented to distinguish the instant invention over the disclosure of Chang et al. in U.S. Pat. No. 4,138,381. The teachings of Chang et al. comprise terpolymers consisting essentially of (a) at least one unsaturated carboxylic acid of 3 to 6 carbon atoms, (b) at least one alkyl acrylate or methacrylate and (c) an ester of the formula $$H_2C=C(R)-C(O)-6(CH_2CHO)_x(CH_2)_yR_1 \ (R_2)$$

where
R and $R_2$ are H or methyl
x is 5 to 80
y is 0 to 20, and
$R_1$ is alkyl or alkylphenyl.

The reference to bipolymers in this reference are scanty being an afterthought not directed to the invention claimed by Chang et al., namely terpolymers.

The superior performance of the copolymers of the subject application compared with terpolymers of the type taught by Chang et al. is illustrated in the following table, which shows that the presence of the methacrylate, MMA) as a third monomer, as taught by Chang et al. has a detrimental effect on the viscosity yield in a standard print paste.

| Methacrylic Acid (MMA)/ Methyl Methacrylate (MMA)/ TERGITOL 15-S-40 Methacrylate | Viscosity of 0.40% Polymer in Standard Print Paste |
|---|---|
| | (centipoise at room temperature) |
| 97.3/ 0/2.7 | 19,000 |
| 87.3/10/2.7 | 12,500 |
| 77.3/20/2.7 | 10,000 |
| 67.3/30/2.7 | 8,000 |
| 57.3/40/2.7 | 7,000 |
| 95.5/ 0/4.5 | 13,000 |
| 55.5/40/4.5 | 10,000 |

These results clearly show a substantial advantage of the MAA/15-S-40 methacrylate copolymer system as taught by the applicants, which is not expected from the teachings of Chang et al.

Although the invention has been described in its preferred form with a certain degree of particularity, it is understood that the present disclosure has been made only by way of example and that numerous changes can be made without departing from the spirit and scope of the invention.

What is claimed is:

1. A normally solid, base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

$$R'(A)_x OC(O)-CR=CH_2$$

wherein R is hydrogen or methyl, R' is a hydrophobe selected from the group consisting of alkyl—O—, alkyl—NH—, and alkyl—CO—, where the alkyl contains 4 to about 30 carbon atoms, A is a divalent radical selected from the group consisting of oxyethylene units or mixed oxyalkylene units having the general formula:

$$(OC_nH_{2n})$$

wherein n is an integer having values from 2 to 4 and x is an integer having values of about 5 to about 40, said surfactant acrylate having an HLB value of about 10 to about 19.

2. Copolymer claimed in claim 1 wherein R is hydrogen.

3. Copolymer claimed in claim 1 wherein R' is alkyl—O—.

4. Copolymer claimed in claim 1 wherein A is oxyethylene.

5. Copolymer claimed in claim 1 wherein A is mixed oxyalkylene groups.

6. Copolymer claimed in claim 1 wherein x is 8 to 12.

7. A normally solid, base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

$$R'(A)_x OC(O)-CR=CH_2$$

wherein R is hydrogen or methyl, R' is a hydrophobe selected from the group consisting of alkyl—NH— and alkyl—CO—, where the alkyl contains 4 to about 30 carbon atoms, A is a divalent radical selected from the group consisting of oxyethylene units or mixed oxyalkylene units having the general formula:

$$(OC_nH_{2n})$$

wherein n is an integer having values from 2 to 4 and x is an integer having values of about 5 to about 40, said surfactant acrylate having an HLB value of about 10 to about 19.

* * * * *